(12) United States Patent
Lee

(10) Patent No.: US 12,370,493 B2
(45) Date of Patent: Jul. 29, 2025

(54) SYSTEM AND METHOD FOR EXTRACTING CARBON DIOXIDE FROM ATMOSPHERIC AIR VIA PRESSURE-SWING ABSORPTION

(71) Applicant: Aeolus Works LLC, Palo Alto, CA (US)

(72) Inventor: William Andy Lee, Palo Alto, CA (US)

(73) Assignee: Aeolus Works LLC, Palo Alto, CA (US)

( * ) Notice: Subject to any disclaimer, the term of this patent is extended or adjusted under 35 U.S.C. 154(b) by 458 days.

(21) Appl. No.: 17/943,599

(22) Filed: Sep. 13, 2022

(65) Prior Publication Data

US 2023/0001347 A1 Jan. 5, 2023

Related U.S. Application Data

(63) Continuation of application No. 17/510,186, filed on Oct. 25, 2021, now Pat. No. 11,571,657, which is a continuation-in-part of application No. 17/079,087, filed on Oct. 23, 2020, now Pat. No. 11,452,968.

(60) Provisional application No. 63/072,332, filed on Aug. 31, 2020, provisional application No. 62/985,759, filed on Mar. 5, 2020, provisional application No. 62/925,721, filed on Oct. 24, 2019.

(51) Int. Cl.
*B01D 53/14* (2006.01)

(52) U.S. Cl.
CPC ..... *B01D 53/1475* (2013.01); *B01D 53/1406* (2013.01); *B01D 53/1425* (2013.01); *B01D 2257/504* (2013.01); *B01D 2258/06* (2013.01)

(58) Field of Classification Search
None
See application file for complete search history.

(56) References Cited

U.S. PATENT DOCUMENTS

| | | | |
|---|---|---|---|
| 11,097,221 B2 * | 8/2021 | Lu | C01B 32/50 |
| 2021/0121818 A1 * | 4/2021 | Lee | B01D 53/1475 |
| 2021/0148311 A1 * | 5/2021 | Murugesan | F01D 25/28 |
| 2022/0387925 A1 * | 12/2022 | Lee | F24F 8/00 |
| 2023/0001347 A1 * | 1/2023 | Lee | B01D 53/047 |

* cited by examiner

*Primary Examiner* — Brit E. Anbacht
(74) *Attorney, Agent, or Firm* — Run8 Patent Group, LLC; Peter Miller

(57) ABSTRACT

One variation of a method for carbon sequestration includes: mixing ambient air including carbon dioxide and secondary gases with a working fluid to generate a first mixture; conveying the first mixture through a compressor to pressurize the first mixture from a first pressure to a second pressure greater than the first pressure to promote absorption of carbon dioxide into the working fluid; depositing the first mixture in a high-pressure vessel to generate an exhaust stream of secondary gases and a second mixture including carbon dioxide dissolved in the working fluid; conveying the second mixture through a turbine configured to extract energy and reduce pressure of the second mixture, from the second pressure to the first pressure, to promote desorption of carbon dioxide from the working fluid; transferring the second mixture into the low-pressure vessel; and releasing carbon dioxide, desorbed from the working fluid, from the low-pressure vessel for collection.

8 Claims, 9 Drawing Sheets

SYSTEM AND METHOD FOR EXTRACTING CARBON DIOXIDE FROM ATMOSPHERIC AIR VIA PRESSURE-SWING ABSORPTION

CROSS-REFERENCE TO RELATED APPLICATIONS

This Application is a continuation application of U.S. patent application Ser. No. 17/510,186, filed on 25 Oct. 2021, which claims the benefit and is a continuation-in-part application of U.S. patent application Ser. No. 17/079,087, filed on 23 Oct. 2020, which claims the benefit of U.S. Provisional Application No. 62/925,721, filed on 24 Oct. 2019, U.S. Provisional Application No. 62/985,759, filed on 5 Mar. 2020, and U.S. Provisional Application No. 63/072,332, filed on 31 Aug. 2020, each of which is incorporated in its entirety by this reference.

TECHNICAL FIELD

This invention relates generally to the field of carbon sequestration and more specifically to a new and useful system and method for pressure-swing absorption of carbon dioxide in the field of carbon sequestration.

DESCRIPTION OF THE EMBODIMENTS

Figure 1:
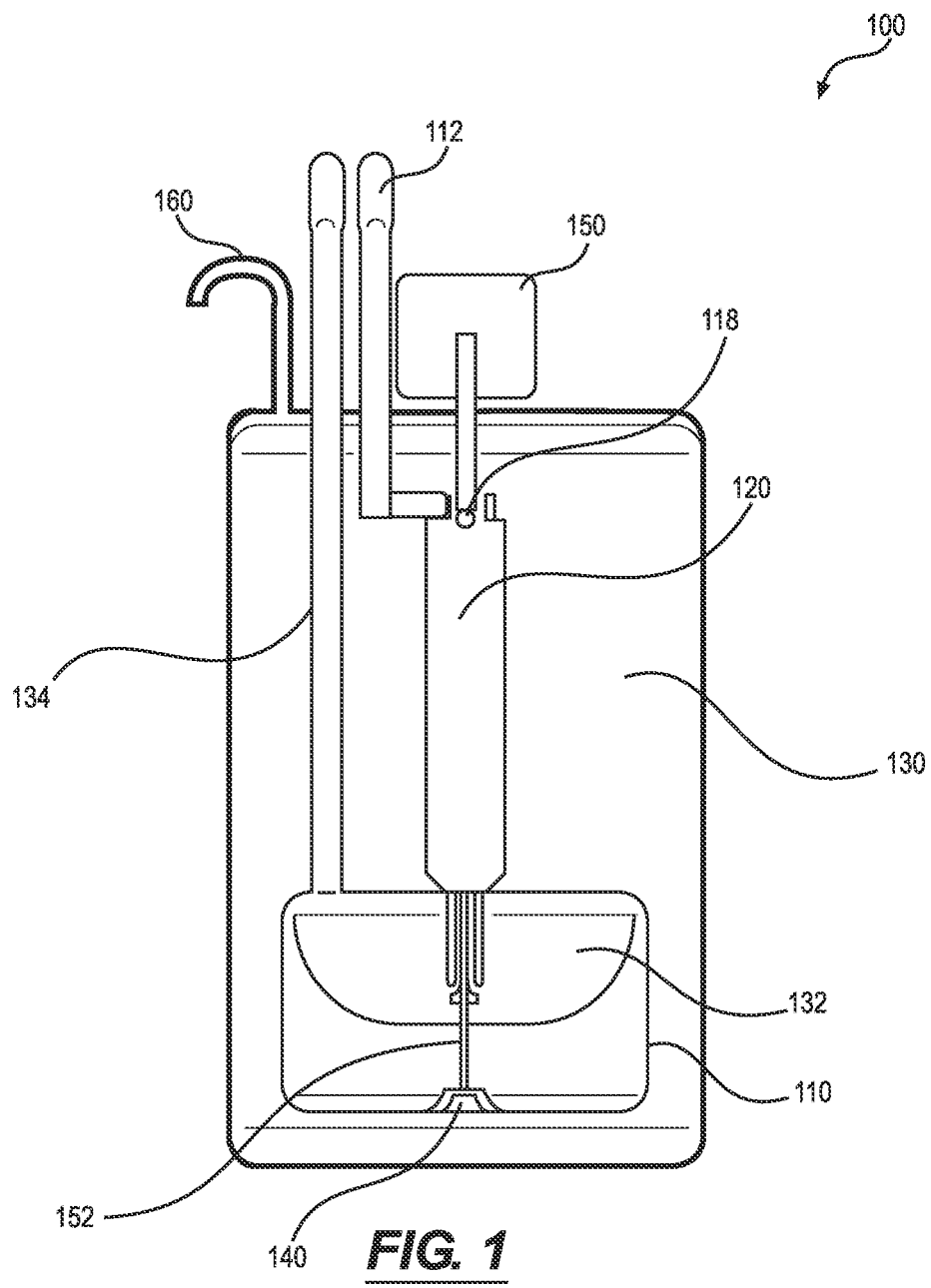
FIG. 1 is a schematic representation of a system.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

As shown in FIGS. 4-8, a method S100 for capturing carbon dioxide from ambient air includes: mixing ambient air including carbon dioxide and secondary gases with a working fluid to generate a first mixture including a volume of ambient air dispersed throughout the working fluid in Block S110; conveying the first mixture through a compressor 120 configured to pressurize the first mixture from a first pressure within a first pressure range at a compressor inlet 118 to a second pressure within a second pressure range at a compressor outlet 122, pressures within the second pressure range exceeding pressures within the first pressure range, to promote absorption of carbon dioxide present in the volume of air into the working fluid in Block S120; transferring the first mixture from the compressor outlet 122 into a high-pressure vessel 110 configured to promote separation of a first exhaust stream including secondary gases and a second mixture including carbon dioxide dissolved in the working fluid in Block S130.

The method S100 further includes: conveying the second mixture from the high-pressure vessel 110 through a turbine 140 configured to reduce the pressure of the second mixture, from a third pressure in a third pressure range at a turbine inlet 138 to a fourth pressure in a fourth pressure range at a turbine outlet 142, pressures in the fourth pressure range less than pressures in the third pressure range, to promote desorption of carbon dioxide from the working fluid in Block S150; transferring the second mixture from the turbine outlet 142 into a low-pressure vessel 130 configured to promote separation of carbon dioxide from the working fluid in Block S160; and releasing carbon dioxide, desorbed from the working fluid, from the low-pressure vessel 130 for collection in Block S170.

In one variation, the method S100 further includes releasing the exhaust stream from the high-pressure vessel no via an exhaust outlet 134 in Block S140.

In one variation, the method S100 further includes: conveying the exhaust stream from the exhaust outlet 134 through a first side of a heat exchanger configured to transfer heat into the exhaust stream flowing through the first side in Block S142; transferring the exhaust stream from the first side of the heat exchanger into a chamber 192 configured to transfer heat into the exhaust stream and increase a pressure of the exhaust stream in Block S144; conveying the exhaust stream from the chamber 192 through a secondary turbine 140 mechanically coupled to the compressor 120 and configured to reduce the pressure of the exhaust stream by extracting energy from the exhaust stream and supply power to the compressor 120 via transfer of energy extracted from the exhaust stream in Block S146; and conveying the exhaust stream from an outlet of the secondary turbine 140 through a second side of the heat exchanger configured to extract heat from the exhaust stream flowing through the second side in Block S148.

In one variation of the method S100, releasing carbon dioxide from the low-pressure vessel 130 for collection further includes: transferring carbon dioxide collected from the low-pressure vessel 130 into a reaction vessel 170 including a liquid metal catalyst configured to promote conversion of carbon dioxide into carbon and oxygen in Block S172; releasing oxygen from the reaction vessel 170 via an exhaust valve in Block S174; and releasing carbon from the reaction vessel 170 for collection in Block S176.

In one variation, the method S100 further includes: conveying the working fluid from the low-pressure vessel 130 through a heat exchanger 180 to reduce a temperature of the working fluid from a first temperature within a first temperature range at a heat exchanger inlet to a second temperature within a second temperature range at a heat exchanger outlet, temperatures within the second temperature range less than temperatures within the first temperature range in Block S180; and conveying the working fluid from the heat exchanger outlet toward the venturi 112, fluidly coupled to the compressor 120, for mixing with ambient air in Block S182.

As shown in FIGS. 4-8, one variation of the method S100 includes: mixing ambient air including carbon dioxide and a set of secondary gases with a working fluid from a low-pressure vessel 130 to generate a first mixture including a volume of air dispersed throughout the working fluid in Block S110; conveying the first mixture through a compressor 120 configured to pressurize the first mixture from a first pressure within a first pressure range at an inlet of the compressor 120 to a second pressure within a second pressure range at an outlet of the compressor 120, the second pressure range greater than the first pressure range, to promote absorption of carbon dioxide present in the volume of air into the working fluid in Block S120; depositing the first mixture in a high-pressure vessel no to generate an exhaust stream including the set of secondary gases present in the volume of air and a second mixture including carbon dioxide dissolved in the working fluid in Block S130; and releasing the exhaust stream from the high-pressure vessel no via an exhaust outlet 134 in Block S140.

The method S100 further includes: conveying the second mixture from the high-pressure vessel no through a turbine 140 configured to extract energy from the second mixture and reduce the pressure of the second mixture, from the second pressure at an inlet of the turbine 140 to the first pressure within the first pressure range at an outlet of the turbine 140, to promote desorption of carbon dioxide from the working fluid in Block S150; transferring the second mixture from the turbine 140 into the low-pressure vessel 130 in Block S160; and releasing carbon dioxide, desorbed from the working fluid, from the low-pressure vessel 130 for collection in Block S110.

2. System

As shown in FIGS. 1-3 and 9, a system 100 includes: a venturi 112; a compressor inlet 118; a compressor 120; a compressor outlet 122; a motor 150; a high-pressure vessel no; an exhaust outlet 134; a turbine inlet 138; a turbine 140; a turbine outlet 142; a low-pressure vessel 130; and a collection outlet 160.

The venturi 112 is configured to mix ambient air including carbon dioxide and secondary gases with a working fluid to generate a first mixture including a volume of ambient air dispersed throughout the working fluid.

The compressor 120 is mechanically coupled to a driveshaft 152 and configured to pressurize the first mixture from a first pressure in a first pressure range at a compressor inlet 118 to a second pressure within a second pressure range greater than the first pressure range at a compressor outlet 122 to promote absorption of carbon dioxide into the working fluid. The motor 150 is mechanically coupled to the driveshaft 152 and configured to drive the compressor 120.

The high-pressure vessel 110 is configured to: receive the first mixture from the compressor outlet 122; and promote separation of the gaseous phase and the liquid phase to generate an exhaust stream including secondary gases and a second mixture including carbon dioxide dissolved in the working fluid. The exhaust outlet 134 is configured to release the exhaust stream from the high-pressure vessel 110.

The turbine 140 is mechanically coupled to the driveshaft 152 and configured to reduce a pressure of the second mixture exiting the high-pressure vessel 110 from a third pressure within a third pressure range at a turbine inlet 138 to a fourth pressure within a fourth pressure range, pressures within the fourth pressure range less than pressures within the third pressure range, at a turbine outlet 142 to promote desorption of carbon dioxide from the working fluid.

The low-pressure vessel 130 is configured to: receive the second mixture from the turbine outlet 142; and promote separation of carbon dioxide from the working fluid. The collection outlet 160 is configured to release a volume of carbon dioxide from the low-pressure vessel 130 for collection.

In one variation, the system 100 further includes a carbon dioxide accumulator 162 configured to store the volume of carbon dioxide released by the collection outlet 160.

In one variation, the system 100 further includes an exhaust outlet 134 configured to collect the exhaust stream including secondary gases from the high-pressure vessel 110.

In one variation, the system 100 further includes a gearbox 154 mechanically coupled to the driveshaft 152 adjacent the motor 150.

In one variation, the system 100 further includes: a heat exchanger 180 coupled to the low-pressure vessel 130 and configured to extract heat from the working fluid exiting the low-pressure vessel 130; and a fluid return 182 configured to convey the working fluid from the heat exchanger to the venturi 112 for mixing with ambient air.

In one variation, the system 100 further includes a heat exchanger 124 coupled to the compressor 120 and configured to regulate a temperature of the first mixture within a target temperature rate from the compressor inlet 118 to the compressor outlet 122 by extracting heat, generated by compressing air present in the first mixture within the compressor 120, from the working fluid.

In one variation, the system 100 further includes: a reaction vessel 170; an oxygen outlet 172; and a carbon accumulator 174. In this variation, the reaction vessel 170: is configured to receive the volume of carbon dioxide released from the collection outlet 160; and includes a liquid metal catalyst configured to promote conversion of carbon dioxide into carbon and oxygen. The oxygen outlet 172 is configured to release oxygen from the reaction vessel 170. The carbon accumulator 174 is configured to collect carbon released from the reaction vessel 170.

In one variation, the system 100 further includes: a heat exchanger 190; a chamber 192; a secondary turbine 194; and a second exhaust outlet 198. In this variation, the heat exchanger 190 is coupled to the exhaust outlet 134 and is configured to transfer heat into the exhaust stream flowing through the exhaust outlet 134. The chamber 192 is: configured to receive the exhaust stream from an outlet of the heat exchanger; configured to increase a pressure of the exhaust stream; and coupled to a heat source configured to transfer heat into the exhaust stream. The secondary turbine 196 is mechanically coupled to the driveshaft 152 and configured to: reduce the pressure of the exhaust stream by extracting energy from the exhaust stream; and transfer energy extracted from the exhaust stream into a torque on the driveshaft 152 to drive the compressor 120. The second exhaust outlet 198 is configured to convey the exhaust stream from an outlet of the secondary turbine 140 through the heat exchanger for extraction of heat from the exhaust stream flowing through the second exhaust outlet 134.

As shown in FIGS. 1-3 and 9, one variation of the system 100 includes: a venturi 112; a compressor 120; a motor 150; a high-pressure vessel 110; an exhaust outlet 134; a turbine inlet 138; a turbine 140; a low-pressure vessel 130; and a collection outlet 160.

In this variation, the venturi 112 is configured to mix ambient air with a working fluid—stored in the low-pressure vessel 130—to generate a first mixture including: a liquid phase including a volume of the working fluid; and a gaseous phase including a volume of air dispersed within the liquid phase, wherein the volume of air includes carbon dioxide and a set of secondary gases.

The compressor 120: is mechanically coupled to a driveshaft 152; and is configured to pressurize the first mixture from a first pressure in a first pressure range at an inlet of the compressor 120 to a second pressure within a second pressure range at an outlet of the compressor 120, wherein the second pressure range is greater than the first pressure range, to promote absorption of carbon dioxide present in the gaseous phase into the working fluid in the liquid phase.

The motor 150 is mechanically coupled to the driveshaft 152 and is configured to drive the compressor 120.

The high-pressure vessel 110 is configured to receive the first mixture, at the second pressure, from the compressor 120.

The exhaust outlet 134 is configured to collect an exhaust stream, including the set of secondary gases separated from the liquid phase of the first mixture, from the high-pressure vessel 110.

The turbine inlet 138 is configured to collect a second mixture—including the working fluid and a volume of carbon dioxide—from the high-pressure vessel 110.

The turbine 140 is mechanically coupled to the driveshaft 152 and is configured to: reduce the second mixture exiting the high-pressure vessel 110 from the second pressure at the turbine inlet 138 to the first pressure at an outlet of the turbine 140 by extracting energy from the second mixture; promote desorption of the volume of carbon dioxide from the volume of working fluid; and transfer energy extracted from the second mixture into a torque on the driveshaft 152 to rotate the compressor 120.

The low-pressure vessel 130 is configured to promote separation of the volume of carbon dioxide from the volume of working fluid of the second mixture.

The collection outlet 160 is configured to collect the volume of carbon dioxide from the low-pressure vessel 130.

3. Applications

Generally, as shown in FIGS. 1-9, the method S100 can be executed by a system 100: to directly capture an air stream including carbon dioxide and other secondary gases found in air (e.g., nitrogen, oxygen, argon) from an air source (e.g., outdoor air, recirculated air within a building); to entrain a working fluid stream with this air stream to generate a gas-liquid mixture; to process this gas-liquid mixture—according to various techniques and/or in combination with additional components—to rapidly increase concentration of carbon dioxide in the working fluid stream for removal of secondary gases from the gas-liquid mixture; and to rapidly separate carbon dioxide from the working fluid stream for collection.

In particular, the method S100 includes: mixing an air stream including carbon dioxide and other secondary gases with a working fluid stream to form an aspirated fluid stream; compressing this aspirated fluid stream to rapidly increase concentration of carbon dioxide dissolved in the working fluid stream via pressurization of the stream; separating the secondary gases from the working fluid stream including the dissolved carbon dioxide in a high-pressure vessel no; expanding the remaining working fluid stream and dissolved oxygen to rapidly decrease concentration of carbon dioxide dissolved in the working fluid stream via depressurization of the fluid stream; and separating the gaseous carbon dioxide from the working fluid stream in a low-pressure vessel 130. This gaseous carbon dioxide can then be collected and stored while the working fluid can be recycled to continuously extract carbon dioxide from an inbound air stream. For example, the method S100 can be executed to extract carbon dioxide from atmospheric air and sequester this carbon dioxide via an energy-efficient (e.g., high energy recovery), scalable, deployable, and cost-effective process.

Traditional systems and/or processes for capturing carbon dioxide from atmospheric air operate with substantial energy losses, are not scalable, and are not cost-effective. Conversely, the system 100 consumes significantly less energy (e.g., 40 percent less energy) than traditional carbon capture systems by implementing methods and techniques for recapturing energy supplied to the system 100. For example, the system 100 can include: a singular driveshaft 152 coupled to a motor 150; a compressor 120 powered by the motor 150 and configured to compress fluids for absorption of carbon dioxide into a working fluid; and a turbine 140 configured to expand fluids for desorption of carbon dioxide from the working fluid. The motor 150 can be configured to supply power to the compressor 120. However, at the turbine 140, high-pressure, high-energy carbon dioxide is expanded to lower-pressure, lower-energy carbon dioxide. This energy gained by the system 100 from the expansion of carbon dioxide can be converted to mechanical energy. Because the turbine 140 and the compressor 120 are coupled to the same driveshaft 152, this mechanical energy generated by the turbine 140 can be leveraged to power the compressor 120, thus reducing energy required by the motor 150 to power the compressor 120.

Further, by mechanically coupling the compressor 120, the turbine 140, and the motor 150 to a singular driveshaft 152 extending along a central axis of the low-pressure vessel 130, the system 100 is limited to a singular moving assembly, thereby: minimizing opportunities for breakage of different parts of the system 100; minimizing a number of parts required for assembly of the system 100; and increasing compactness and space efficiency of the system 100.

Furthermore, because the system 100 includes few moving parts and is scalable, the system 100 can be deployed to various locations to capture carbon dioxide from atmospheric air at these various locations. For example, the system 100 can be deployed as a modular unit and distributed about a large geographic region to sequester carbon dioxide from atmospheric air in this geographic region. In another example, the system 100 can be mounted to a building or structure. In each of the examples, the system 100 can be scaled to an appropriate size based on the location of deployment.

The system 100 is configured to capture carbon dioxide from ambient air (e.g., atmospheric air) by leveraging solubility of carbon dioxide in the working fluid (e.g., water) at different pressures. In particular, the system 100 is configured to: concentrate carbon dioxide in the working fluid and separate out secondary gases at high pressures in a high-pressure vessel no; and separate carbon dioxide from the working fluid at low pressures in a low-pressure vessel 130 (e.g., after secondary gases have been removed). Therefore, by oscillating the working fluid between two vessels (e.g., a high-pressure vessel no and a low-pressure vessel 130, the system 100 can leverage changes in pressure to control a carbon dioxide carrying capacity of the working fluid and thus control absorption and desorption of carbon dioxide form the working fluid.

4. Nested High-Pressure & Low-pressure Vessels

In one implementation, as shown in FIG. 1, the system 100 includes: a low-pressure vessel 130 configured to hold fluid at pressures within a first pressure range; and a high-pressure vessel 110—nested within the low-pressure vessel 130—configured to hold fluids at pressures within a second pressure range exceeding pressures within the first pressure range. Generally, in this implementation, the high-pressure vessel 110 and the low-pressure vessel 130 are coextensive. Further, the high-pressure vessel no and the low-pressure vessel 130 are structural and can therefore carry secondary components of the system 100. In this implementation, because the high-pressure and low-pressure vessel 130s 110, 130 are nested and structural, the vessels, valves, driveshaft 152, and other elements of the system 100 can be arranged in a compact configuration with a single moving element, thereby: limiting features projecting outwardly from a body of the system 100 defined by the low-pressure vessel 130; limiting the overall diameter of the system 100 (e.g., to a diameter of the low-pressure vessel 130) per unit mass or volume flow rate of ambient air through the system 100 (and therefore mass rate of carbon dioxide captured by the system 100); increasing compactness and space efficiency of the system 100 per unit mass or volume flow rate; reducing weight of the system 100 by supporting structures on a shell (exhibiting high hoop strength) defined by the low-pressure vessel 130; and improving ease of storage, transport, and setups of the system 100.

In this implementation, the system 100 further includes: a motor 150 external the low-pressure vessel 130 and mechanically coupled to a driveshaft 152 extending through the low-pressure vessel 130 (e.g., along a central axis of the low-pressure vessel 130); a compressor 120 nested within the low-pressure vessel 130 and mechanically coupled to the driveshaft 152; and a turbine 140 nested within the low-pressure vessel 130, mechanically coupled to the driveshaft 152 below the compressor 120, and fluidly coupled to the compressor 120. By mechanically coupling the compressor 120, the turbine 140, and the motor 150 to a singular driveshaft 152 extending along a central axis of the low-pressure vessel 130, the system 100 is limited to a singular moving assembly thereby minimizing points of failure within the system 100 and minimizing opportunities for breakage of different parts of the system 100. Further, the system 100 can leverage energy recaptured by the turbine 140 via expansion of fluids to generate a torque on the driveshaft 152 and therefore rotate the compressor 120, thereby reducing energy required to be input by the motor 150 to rotate the compressor 120.

4.1 Working Fluid+Air (Entrainment)

Block S110 of the method S100 recites mixing ambient air including carbon dioxide and a set of secondary gases with a working fluid from a low-pressure vessel 130 to generate a first mixture including a volume of air dispersed throughout the working fluid. In particular, a volume of the working fluid can be entrained with a volume of ambient air, such that the resulting first mixture defines: a liquid phase including the volume of the working fluid; and a gaseous phase including the volume of air dispersed throughout the volume of the working fluid in the liquid phase.

In one implementation, air—including carbon dioxide and other secondary gases (e.g., nitrogen, argon)—is drawn in from an external source (e.g., a surrounding environment) via a venturi 112. The air travels through an air inlet (e.g., an enclosed air inlet) extending from a surrounding environment into the low-pressure vessel 130 and toward the venturi 112, such that the air does not mix with the working fluid present in the low-pressure vessel 130 while travelling through the enclosed inlet. Simultaneously, a working fluid is drawn into an opening from the low-pressure vessel 130 and through the venturi 112 where it is mixed with the air.

For example, a volume of air can be drawn, from an external source (e.g., atmospheric air), through an air inlet via a venturi 112 nested within the low-pressure vessel 130. Simultaneously, a volume of water (i.e., the working fluid) can be drawn through a compressor inlet 118 via a compressor 120, the compressor inlet 118 fluidly coupled to the venturi 112 and the compressor 120. The volume of air—including carbon dioxide and a set of secondary gases (e.g., nitrogen, argon, oxygen)—can then be mixed with the volume of water in the compressor inlet 118 120 prior to reaching the compressor 120. When mixed, the volume of air and the volume of water generate a first mixture (e.g., a gas-liquid mixture) including: a liquid phase including the volume of water; and a gaseous phase including a volume of air (e.g., of carbon dioxide and the set of secondary gases) distributed throughout the volume of water of the liquid phase.

The working fluid can be selected based on absorbency of carbon dioxide and other secondary gases present in atmospheric air in the working fluid. For example, the working fluid can be configured to absorb carbon dioxide at higher pressures and to release carbon dioxide at lower pressures. Further, the working fluid can be configured to prioritize absorption of carbon dioxide over other secondary gases at particular pressures and temperatures, such that the working fluid selectively absorbs carbon dioxide and limits absorption of (e.g., does not absorb) secondary gases present in air. In one implementation, the working fluid can be water. In another implementation, to enable further absorption of carbon dioxide from the volume of air into the working fluid, the working fluid can be treated with solvents configured to increase carbon dioxide absorption. For example, the working fluid can include an amine solvent (e.g., an ethanolamine) dissolved in water.

4.2 Pressurizing the First Mixture

Block S120 of the method S100 recites conveying the first mixture through a compressor 120 configured to pressurize the first mixture from a first pressure within a first pressure range at an inlet of the compressor 120 to a second pressure within a second pressure range at an outlet of the compressor 120, the second pressure range greater than the first pressure range, to promote absorption of carbon dioxide present in the volume of air into the working fluid. In particular, the compressor 120 can be configured to receive the first mixture at a first pressure and output the first mixture at a second pressure greater than the first pressure. As pressure of the first mixture increases along the compressor 120, a capacity of the working fluid for absorbing carbon dioxide increases, thus enabling an increase in concentration of carbon dioxide in the working fluid in the liquid phase.

Further, to prevent absorption of other secondary gases present in the first mixture into the working fluid, the system 100 can be configured to hold the first mixture at temperatures within a particular temperature range in which the working fluid selectively absorbs carbon dioxide over other secondary gases. For example, the system 200 can include water as the working fluid. At temperatures exceeding 35 degrees Celsius, water may absorb carbon dioxide at significantly higher rates (e.g., 90 percent to 100 percent higher) than other secondary gases present in air in the first mixture (e.g., Nitrogen, Argon). Therefore, in this example, the system 100 can be configured to maintain the first mixture at temperatures above 35 degrees Celsius and below a maximum temperature (e.g., 45 degrees Celsius) at which carbon dioxide is significantly less soluble in water.

In one implementation, the compressor 120 can be configured to isothermally compress air present in the first mixture, thereby increasing pump efficiency. For example, as gases (e.g., carbon dioxide, nitrogen, argon) present in air within the first mixture are compressed, temperatures of these gases increase. However, this generated heat can be transferred to the working fluid nearly instantaneously, such that the gases maintain approximately (e.g., within 2 degrees Celsius) constant temperatures. To prevent the working fluid from heating above a maximum temperature, the system 100 can include a heat exchanger 124 coupled to the compressor 120 and configured to maintain temperatures of the working fluid within a particular temperature range (e.g., between 35 degrees Celsius and 40 degrees Celsius).

4.3 Separation of Non-CO2 Gases

Block S130 of the method S100 recites depositing the first mixture in a high-pressure vessel no to generate an exhaust stream including the set of secondary gases present in the volume of air and a second mixture including carbon dioxide dissolved in the working fluid. In particular, the high-pressure vessel no can be fluidly coupled to the compressor 120 such that the compressor 120 transfers the first mixture into the high-pressure vessel no at elevated pressures due to compression of the first mixture by the compressor 120. The high-pressure vessel 110 can be configured to maintain these elevated pressures and/or to further increase pressure of the first mixture within the high-pressure vessel 110.

The high-pressure vessel 110 (e.g., a high-pressure chamber) can be nested within the low-pressure vessel 130 (e.g., a low-pressure chamber). For example, the high-pressure vessel no can define: a second diameter less than a first diameter of the low-pressure vessel 130; and a second height less than a first height of the low-pressure vessel 130. In this example, the low-pressure vessel 130 and the high-pressure vessel 110 can be concentric the driveshaft 152 of the motor 150, such that the first mixture travels vertically from the compressor 120 into the high-pressure vessel 110.

In one implementation, the system 100 includes a high-pressure vessel 110 (i.e., the high-pressure vessel 110) defining an upper region and lower region. The upper region can include an exhaust outlet 134 through which secondary gases separated from the working fluid can exit the high-pressure vessel 110. The lower region can include an outlet through which the working fluid and dissolved carbon dioxide (i.e., the second mixture) can exit the high-pressure vessel 110. Therefore, the high-pressure vessel 110 can be configured to: separate and accumulate the gaseous phase of the first mixture in the upper region of the high-pressure vessel 110; and separate and accumulate the liquid phase of the first mixture in the lower region of the high-pressure vessel 110. Once the secondary gases have been removed (e.g., below a particular concentration), the resulting exhaust stream can be released via the exhaust outlet 134 and the resulting second mixture can exit the high-pressure reactor via the outlet.

In one implementation, the high-pressure vessel 110 includes a structure 152 (e.g., a "bowl-like" structure) configured to increase separation of the gaseous phase of the first mixture from the liquid phase by increasing a surface area of the first mixture within the high-pressure vessel 110. For example, the high-pressure vessel 110 can include a bowl 132 arranged within the upper region of the high-pressure vessel 110 and defining a concave surface curved upward toward the compressor 120. The first mixture can then flow downward from an outlet of the compressor 120 and into the high-pressure vessel 110, where it splashes onto the concave surface of the bowl 132. The first mixture can then splash out of the bowl 132 into the lower region of the high-pressure vessel 110 and/or spill over the edges of the concave surface of the bowl 132 down into the lower region. By enabling the first mixture to splash in and out of the bowl 132 and eventually fall downward into the lower region of the high-pressure vessel 110, the system 100 promotes separation of the secondary gases from the working fluid and dissolved carbon dioxide by increasing surface area of the first mixture and thus increase evaporation of the secondary gases across this surface area.

4.3.1 Exhaust Stream

Block S140 of the method S100 recites releasing the exhaust stream from the high-pressure vessel no via an exhaust outlet 134. As described above, the exhaust stream can separate from the second mixture within the high-pressure vessel no via gravity (e.g., due to differences in density). This exhaust stream can exit the high-pressure vessel no via the exhaust outlet 134 located within the upper region of the high-pressure vessel 110.

In one variation, the system 100 can include a turbocharger coupled to the exhaust outlet 134 of the high-pressure vessel no and to the venturi 112. The turbocharger can include a turbo-expander 136 mechanically coupled to a turbo-compressor 120 137 via a shared driveshaft 152 (e.g., distinct from driveshaft 152). The turbo-compressor 120 137 can be fluidly coupled to the venturi 112. In this variation, hot compressed gases (e.g., secondary gases) exiting the high-pressure vessel no can be transferred via the exhaust outlet 134 to the turbo-expander 136. The turbo-expander 136 can extract energy from these high-energy, high-pressure secondary gases via expansion to generate a torque on the shared driveshaft 152 to rotate the turbo-compressor 120 137. The turbo-compressor 120 137 can be configured to intake ambient air and compress this air, thereby increasing pressure of the air. The turbo-compressor 120 137 can then feed this compressed air to the venturi 112. Therefore, by including this turbocharger, a portion of the air stream entering the venturi 112 is already pressurized above ambient pressure, thus enabling further and faster absorption of carbon dioxide into the working fluid and minimizing energy required by the compressor 120 to compress air in the first mixture.

4.4 Depressurizing the Second Mixture

Block S150 of the method S100 recites conveying the second mixture from the high-pressure vessel 110 through a turbine 140 configured to extract energy from the second mixture and reduce the pressure of the second mixture, from the second pressure at an inlet of the turbine 140 to the first pressure within the first pressure range at an outlet of the turbine 140, to promote desorption of carbon dioxide from the working fluid. In particular, the system 100 can include the turbine 140 (e.g., a Francis turbine 140) configured to receive the second mixture at a first pressure and output the second mixture at a second pressure less than the first pressure. As pressure of the second mixture decreases along the turbine 140, the capacity of the working fluid for absorbing carbon dioxide decreases, thus enabling separation of carbon dioxide from the working fluid in the liquid phase.

The turbine 140—mechanically coupled to the compressor 120 via the driveshaft 152—can be configured to recover and recycle energy lost in the compressor 120. For example, as pressure builds up in the high-pressure vessel 110 over time, the turbine 140—thermally coupled to the high-pressure vessel 110—heats up and eventually reaches a steady state. Once the turbine 140 reaches this steady state, any excess energy harnessed from running the second mixture through the turbine 140 can be leveraged to power the compressor 120. Therefore, the energy input by the motor 150 in order to power the compressor 120 will decrease over time as the turbine 140 approaches steady state, thus decreasing power required to maintain operation of the system 100 and decreasing operating costs.

The turbine 140 can be mechanically coupled to the compressor 120 and the motor 150 via the driveshaft 152. Further, the turbine 140 can be nested within both the low-pressure vessel 130 and the high-pressure vessel 110, such that an outer face of the turbine 140—including the outlet of the turbine 140—is approximately flush with a bottom surface of the high-pressure vessel 110. Therefore, high-pressure high-energy fluid (i.e., the second mixture) exiting the high-pressure vessel no is automatically drawn into the turbine 140 via gravity. At an outlet of the turbine 140, the resulting low-pressure low-energy fluid is automatically released into the low-pressure vessel 130.

4.5 $CO_2$ Capture

Block S160 of the method S100 recites transferring the second mixture from the turbine 140 into the low-pressure vessel 130. In particular, once the second mixture exits the turbine 140, the second mixture can be released into the low-pressure vessel 130 at reduced pressures. The low-pressure vessel 130—encompassing the high-pressure vessel 110, the compressor 120, and the turbine 140—can be configured to maintain these reduced pressures and/or to further reduce pressure of the second mixture within the low-pressure vessel 130. At these reduced pressures, the carbon dioxide separates from the working fluid in the liquid phase to generate carbon dioxide gas distinct from the working fluid.

To increase an extent and/or rate of separation of the carbon dioxide gas from the working fluid, the low-pressure vessel 130 can implement methods and/or techniques for cooling the working fluid within the low-pressure vessel 130. For example, the system 100 can include a set of copper coils (i.e., a cooling jacket) surrounding the low-pressure vessel 130. Further, in this example, the low-pressure vessel 130 can include a first temperature sensor arranged near a top of the low-pressure vessel 130 and a second temperature sensor arranged near a bottom of the low-pressure vessel 130. The system 100 can therefore monitor a temperature gradient across the low-pressure vessel 130 and cool the low-pressure vessel 130 via pumping refrigerant (e.g., cool water, ethylene glycol) through the set of copper coils to maintain a particular temperature gradient within the low-pressure vessel 130. By maintaining the low-pressure vessel 130 within a particular temperature range or maintaining a particular temperature gradient across the low-pressure vessel 130, the system 100 enables the working fluid—including dissolved carbon dioxide—to cool to sufficiently low temperatures (e.g., between 30 and 35 degrees Celsius) quickly, such that the carbon dioxide dissolved in the working fluid separates from the working fluid and exits the low-pressure vessel 130 via the collection outlet 160 before the working fluid exits the low-pressure vessel 130 and is recycled back to the compressor 120.

Block S170 of the method S100 recites releasing carbon dioxide, desorbed from the working fluid, from the low-pressure vessel 130 for collection. The low-pressure vessel 130 can include a collection outlet 160 through which gaseous carbon dioxide, separated from the working fluid—can exit the low-pressure vessel 130. This carbon dioxide released from the collection outlet 160 can be collected (e.g., bottled) and stored. Once the carbon dioxide is removed from the low-pressure vessel 130, the clean working fluid can be recycled back through the system 100.

4.6 Recycling the Working Fluid

The working fluid in the low-pressure vessel 130—separated from the gaseous carbon dioxide—can be returned to the venturi 112 for mixing with ambient air. By recycling this working fluid, the system 100 can continuously entrain the circling working fluid with a feed of ambient air for continuous removal of carbon dioxide from the feed of ambient air.

In one implementation, the system 100 can include a heat exchanger 180 (e.g., radiator, a cooling tower) fluidly coupled to the low-pressure vessel 130. This heat exchanger 180 can be configured to extract heat from the working fluid exiting the low-pressure vessel 130. The system 100 can also include a fluid return 182 configured to convey the working fluid from the heat exchanger to the venturi 112 for mixing with ambient. air. In this implementation, by extracting heat from (e.g., cooling) the working fluid before returning the working fluid to the venturi 112, the system 100 can regulate a temperature of the working fluid fed to the venturi 112 within a target temperature range, such as within a target temperature range configured to promote absorption of carbon dioxide into the working fluid and prevent absorption of secondary gases (e.g., nitrogen, oxygen) into the working fluid.

Figure 3:
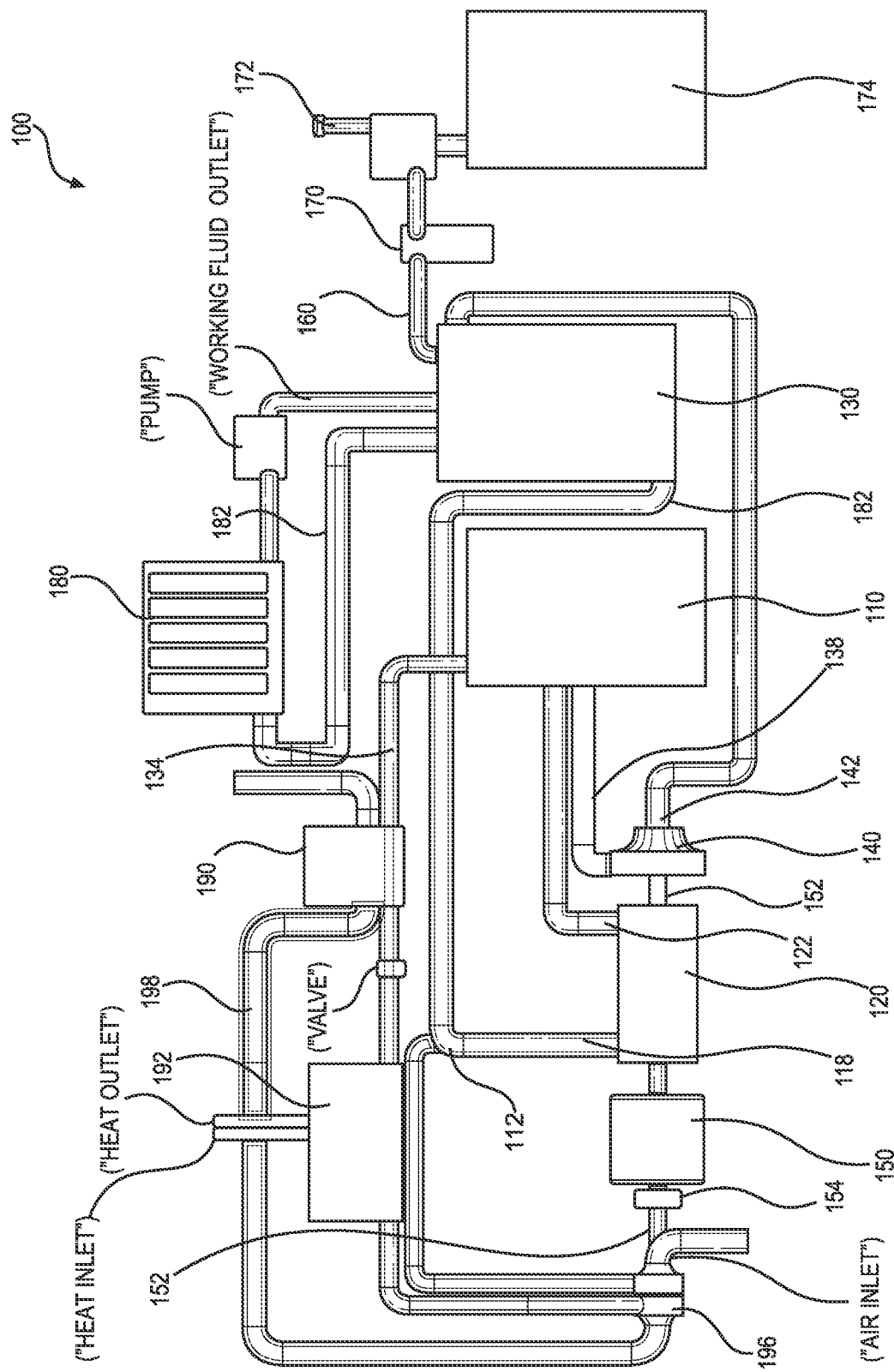
FIG. 3 is a schematic representation of the system.
Figure 4:
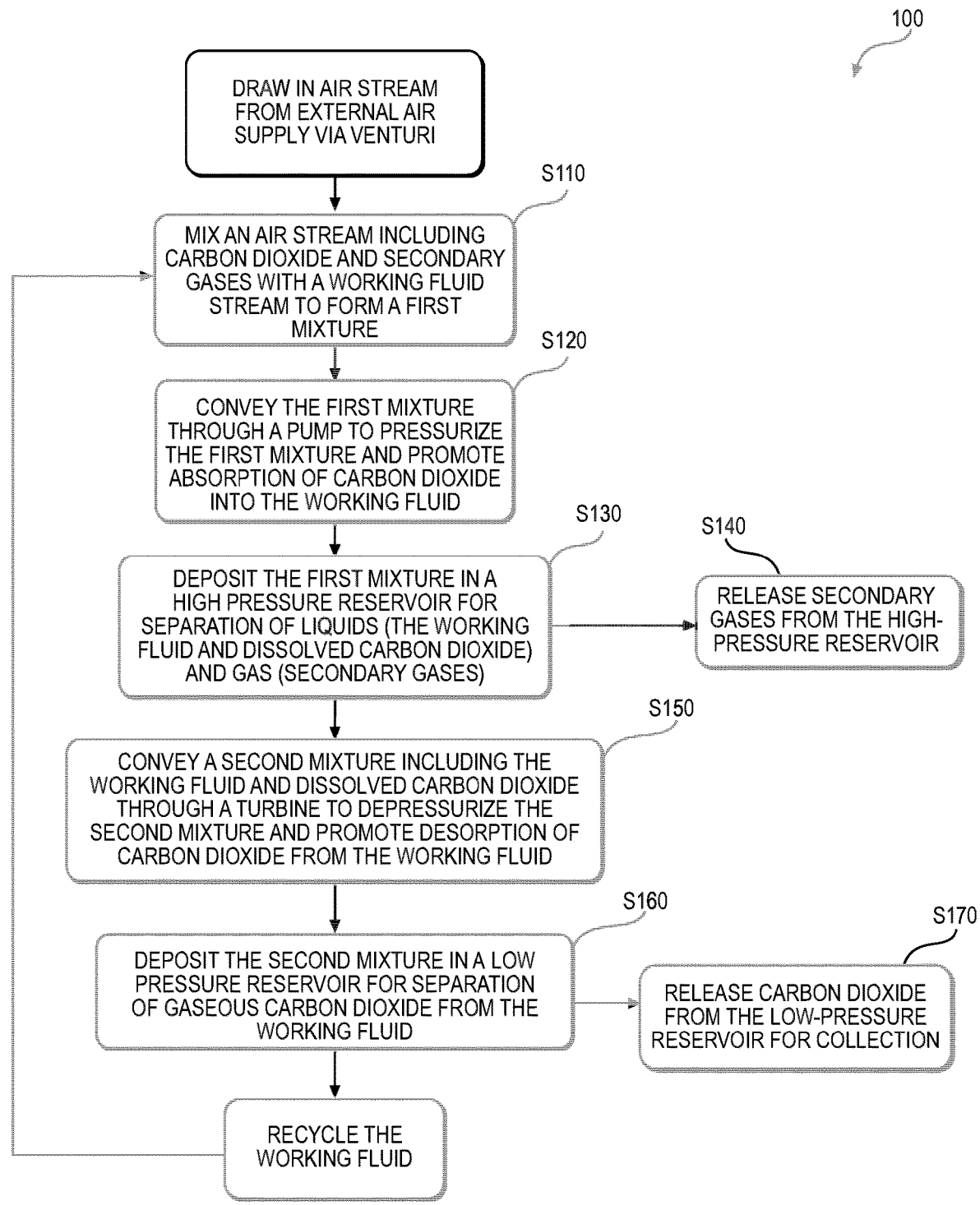
FIG. 4 is a flowchart representation of a method.
Figure 5:
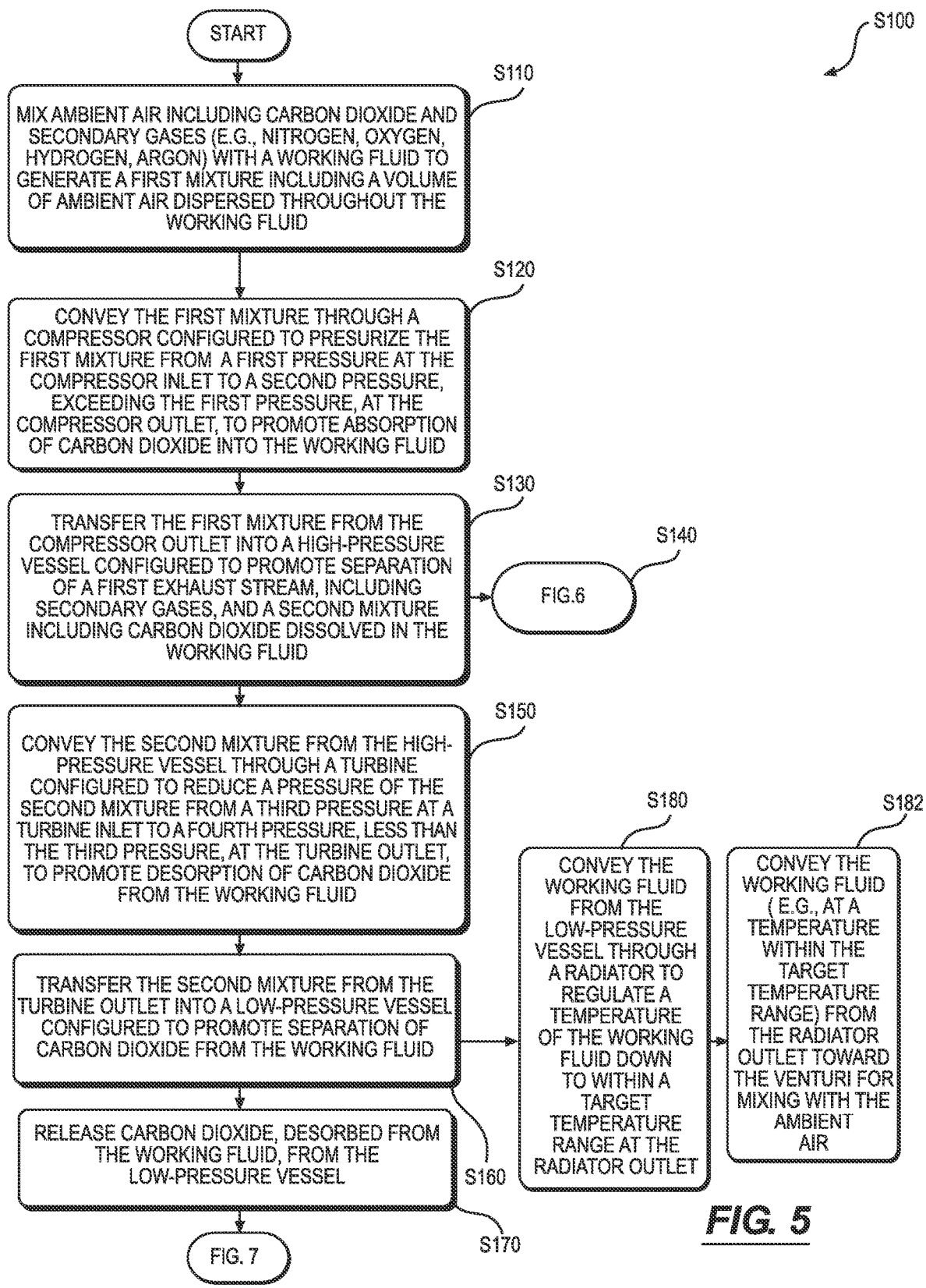
FIG. 5 is a flowchart representation of the method.
Figure 6:
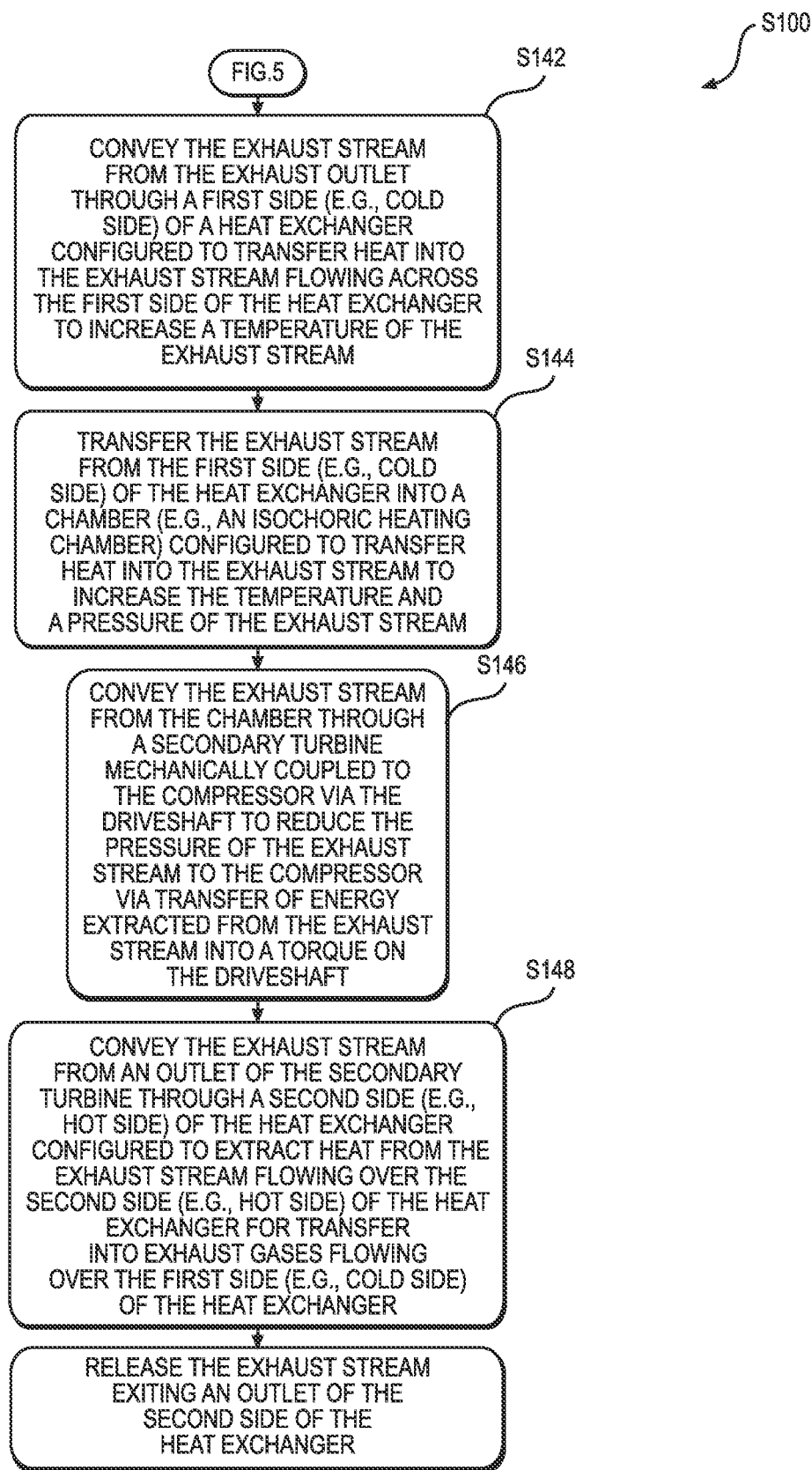
FIG. 6 is a flowchart representation of the method.
Figure 7:
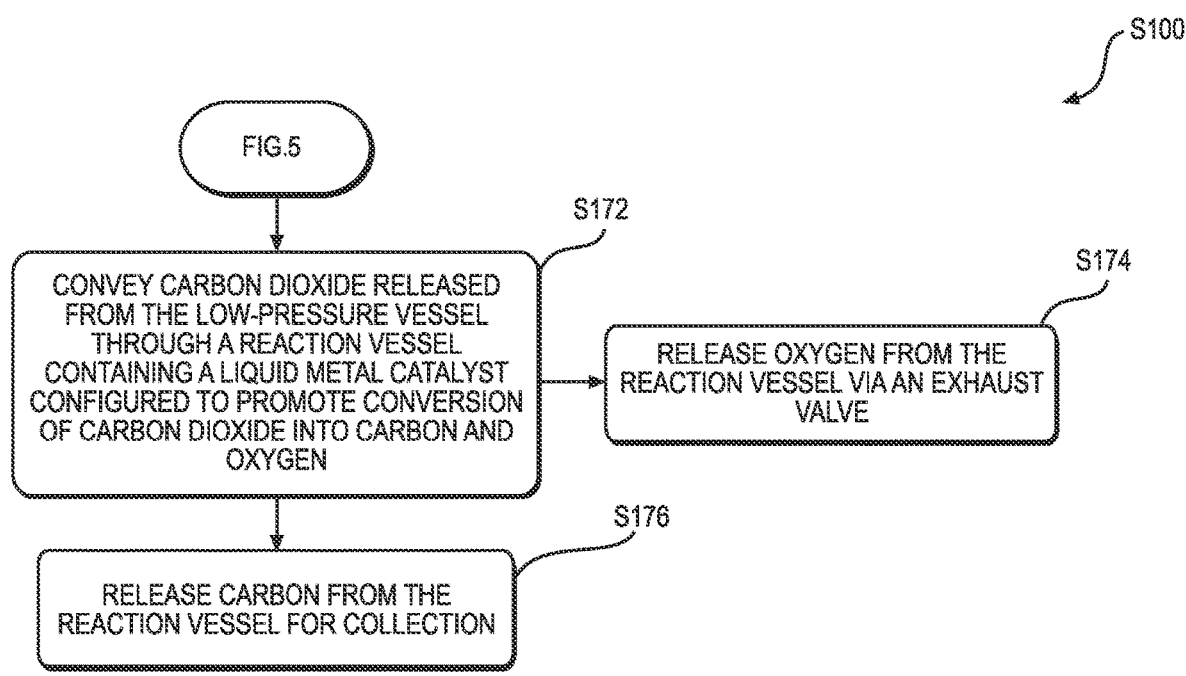
FIG. 7 is a flowchart representation of the method.
Figure 8:
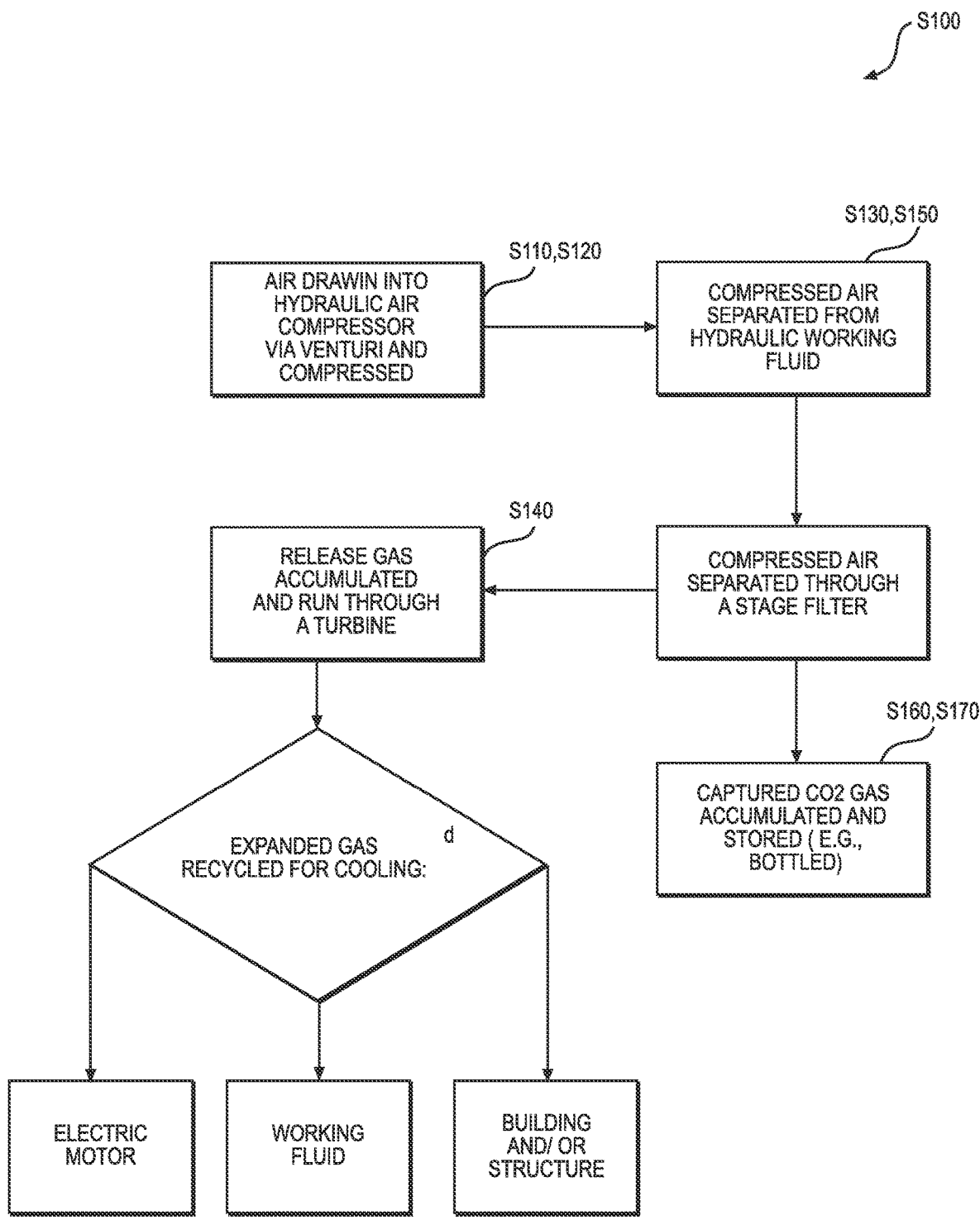
FIG. 8 is a flowchart representation of the method.

For example, the system 100 can include a heat exchanger 180 (e.g., a radiator) fluidly coupled to an outlet of the low-pressure vessel 130. The system 100 can include a pump coupled to the outlet of the low-pressure vessel 130 and configured to draw the working fluid through the outlet (or "working fluid outlet") of the low-pressure vessel 130 and into an inlet of the heat exchanger 180. The heat exchanger 180 can be configured to reduce a temperature of the working fluid from a first temperature within a first temperature range at the inlet of the heat exchanger to a second temperature within a target temperature range at an outlet of the heat exchanger, temperatures within the target temperature range less than temperatures within the first temperature range. The fluid return 182 can then transfer the working fluid from the outlet of the heat exchanger to the venturi 112 for mixing with ambient air at a temperature (e.g., the second temperature) within the target temperature range. Additionally and/or alternatively, as shown in FIG. 3, the fluid return 182 can include: a first section configured to return the working fluid from the outlet of the heat exchanger to the low-pressure vessel 130; and a second section configured to return the working fluid from the low-pressure vessel 130 to the venturi 112.

5. Separated Low-Pressure and High-Pressure Vessels

Figure 2:
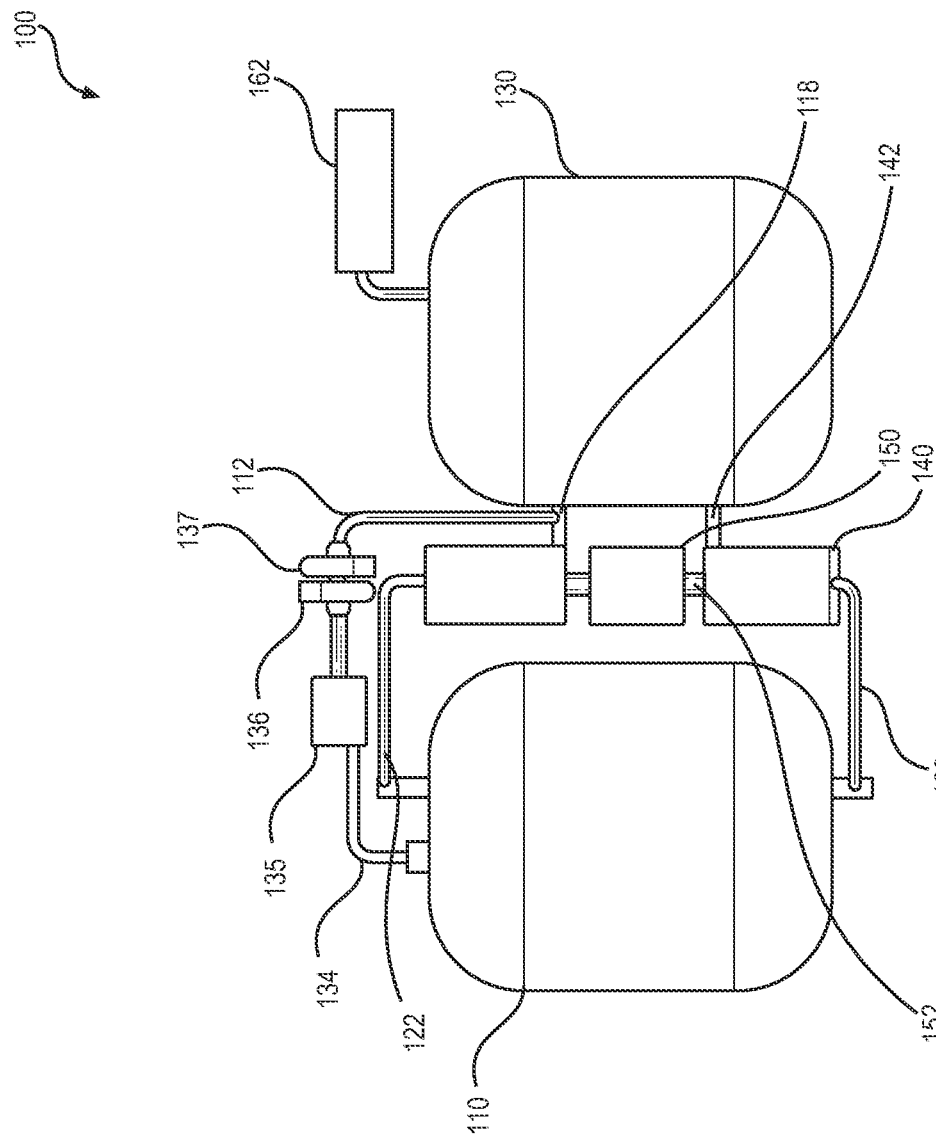
FIG. 2 is a schematic representation of the system.

In another implementation, as shown in FIG. 2, the low-pressure vessel 130 and the high-pressure vessel 110 are not nested (e.g., not coextensive). In this implementation, the low-pressure vessel 130 is fluidly coupled to the high-pressure vessel 110, and the low-pressure vessel 130, the compressor 120, the high-pressure vessel 110, and the turbine 140 form a loop, each fluidly coupled to one another. In this implementation, the system 100 can include a singular driveshaft 152 coupled to the compressor 120, the motor 150, and the turbine 140. In this implementation, the driveshaft 152 is located external the low-pressure vessel 130.

For example, in this implementation, the system 100 can include: a compressor 120 mechanically coupled to a driveshaft 152 (e.g., extending vertically below the compressor 120) and configured to pressurize the liquid phase during transfer from the low-pressure vessel 130 into the high-pressure vessel 110; a turbine 140 mechanically coupled to the driveshaft 152 (e.g., below the motor 150) and configured to extract energy from the second mixture and to transform this energy into rotation of the compressor 120 in cooperation with the motor 150 (e.g., to reduce power consumption of the motor 150 per unit of carbon dioxide captured by the system 110); a motor 150 coupled to the compressor 120 and the turbine 140 via the driveshaft 152; a low-pressure vessel 130 fluidly coupled to a compressor inlet 118 of the compressor 120 and to a turbine outlet 142 of the turbine 140; and a high-pressure vessel 110 fluidly coupled to a compressor outlet 122 of the compressor 120 and to a turbine inlet 138 of the turbine 140. In this example, the system 100 further includes: a venturi 112 configured to entrain ambient air into a working fluid flowing from the low-pressure vessel 130 toward the compressor 120; an exhaust outlet 134 coupled to the high-pressure vessel 110 and configured to release secondary gases (e.g., oxygen, nitrogen)—not absorbed into the working fluid at higher pressures in the second pressure range—from the high-pressure vessel 110; and a collection outlet 160 coupled to the low-pressure vessel 130 and configured to release carbon dioxide—desorbed from the working fluid at lower pressures in the first pressure range—from the low-pressure vessel 130 120, such as by transfer into a holding tank or other storage. In this implementation, the system 100 can similarly execute Blocks of the method S100 as described above.

5.1 Carbon Dioxide Capture

In this implementation, in which the high-pressure vessel 110 and the low-pressure vessel 130 are not coextensive, air—including carbon dioxide and the set of secondary gases—can be drawn through the venturi 112 and fed to the compressor inlet 118. Simultaneously, the working fluid can be drawn from the low-pressure vessel 130 and into the compressor inlet 118 by the compressor 120, where the working fluid is mixed with air to form the first mixture. The first mixture—including a volume of working fluid and a volume of air dispersed within the volume of working fluid—can then be fed to the compressor 120.

At the compressor 120, the first mixture is compressed from pressures within a first pressure range to pressures within a second pressure range, pressures within the second pressure range exceeding pressures within the first pressure range. As pressure increases in the first mixture, the working fluid's capacity for carbon dioxide absorption increases and the concentration of dissolved carbon dioxide in the working fluid increases. Thus, after compression by the compressor 120, the first mixture includes a gaseous phase including the set of secondary gases and a liquid phase including the working fluid and dissolved carbon dioxide (or "carbonated working fluid").

The first mixture can then be routed to the high-pressure vessel 110 via the compressor outlet 122. The high-pressure vessel 110 can be configured to hold fluids present in the high-pressure vessel 110 at pressures within the second pressure range, such that carbon dioxide remains dissolved in the working fluid in the liquid phase. Due to differences in densities of the liquid phase and the gaseous phase, the gaseous phase separates to an upper region of the high-pressure vessel 110, while the liquid phase separates to a lower region of the high-pressure vessel 110. Alternatively, in one variation, the high-pressure vessel 110 can be configured to enable separation of the gaseous phase and the liquid phase via vortex separation.

The secondary gases of the gaseous phase can then exit the high-pressure vessel 110 through an exhaust outlet 134 coupled to the upper region of the high-pressure vessel 110. These heated secondary gases can then be released and/or collected and recycled to power the compressor 120, the turbine 140, and/or a turbocharger as described below.

The carbonated working fluid—including dissolved carbon dioxide in the working fluid—can exit the high-pressure vessel 110 through a turbine inlet 138 coupled to the lower region of the high-pressure vessel 110. This carbonated working fluid can then be fed to the turbine 140 coupled to the turbine inlet 138. At the turbine 140, the carbonated working fluid is expanded from pressures within the second pressure range to pressures within a third pressure range (e.g., approximating the first pressure range), pressures within the third pressure range less than pressures within the second pressure range. As pressure decreases in the carbonated working fluid, the working fluid's capacity for carbon dioxide absorption decreases and the concentration of dissolved carbon dioxide in the working fluid decreases, thereby forming a gaseous phase of carbon dioxide distinct from the liquid phase of the working fluid.

The carbonated working fluid—including the gaseous phase of carbon dioxide and the liquid phase of the working fluid—can then be routed to the low-pressure vessel 130 via the turbine outlet 142. The low-pressure vessel 130 can be configured to hold fluids present in the low-pressure vessel 130 at pressures within the third pressure range to promote further desorption of the carbon dioxide from the working fluid in the liquid phase. Due to differences in densities of the working fluid and the gaseous carbon dioxide, the carbon dioxide separates to an upper region of the low-pressure vessel 130, while the working fluid remains in a lower region of the low-pressure vessel 130. Alternatively, in one variation, the low-pressure vessel 130 can be configured to enable separation of the working fluid and the gaseous carbon dioxide via vortex separation.

The carbon dioxide can then exit the low-pressure vessel 130 through a collection outlet 160 where it can be routed to a carbon dioxide accumulator 162 for storage. The working fluid remaining in the low-pressure vessel 130 can then be drawn back through the venturi 112 and the compressor inlet 118 for continuous carbon dioxide capture.

6. Variation: Turbocharger

In one variation, as shown in FIG. 2, the system 100 can include a turbo-expander 136 coupled to the exhaust outlet 134 of the high-pressure vessel 110. The turbo-expander 136 can be mechanically coupled to a turbo-compressor 120 137 via a shared driveshaft 152 (e.g., distinct from driveshaft 152), thus forming a turbocharger. The turbo-compressor 120 137 can be fluidly coupled to an inlet of the venturi 112. In this variation, hot compressed gases (e.g., secondary gases) exiting the high-pressure vessel 110 can be transferred via the exhaust outlet 134 to the turbo-expander 136. The turbo-expander 136 can expand these hot compressed gases thereby reducing pressure of the gases. Simultaneously, rotation of the turbo-expander 136—driven by the exhaust stream of the high-pressure vessel 110—drives rotation of the turbo-compressor 120 137 mechanically coupled to the shared driveshaft 152. The turbo-compressor 120 137 can be configured to intake atmospheric air and compress this air, thereby increasing pressure of the air. The turbo-compressor 120 137 can then feed this compressed air to the inlet of the venturi 112. Therefore, by implementing this combination of the turbo-expander 136 and the turbo-compressor 120 137, a portion of the air stream entering the venturi 112 is already pressurized above ambient pressure, thus enabling further and faster absorption of carbon dioxide into the working fluid and minimizing energy required by the compressor 120 to compress air in the first mixture.

7. Variation: Secondary Turbine

In one variation, the system 100 can be configured to recycle energy captured from the exhaust stream to supply power to the compressor 120. In particular, the system 100 can include a secondary turbine 140 (e.g., a multistage axial flow turbine 140, a multistage radial flow turbine 140, a piston)—mechanically coupled to the driveshaft 152—configured to extract energy from the high-pressure, high-energy, exhaust stream for transferring into a torque on the driveshaft 152 to drive to the compressor 120.

In this variation, the system 100 can include a series of heating elements configured to transfer heat into the exhaust stream (e.g., including secondary gases) to increase the temperature of the exhaust stream prior to conveying the exhaust stream through the turbine 140.

In one implementation, the system 100 includes a heat exchanger 190 coupled (e.g., fluidly coupled) to the exhaust outlet 134. In particular, Block S142 of the method S100 recites conveying the exhaust stream from the exhaust outlet 134 through a first side of a heat exchanger 190 configured to transfer heat into the exhaust stream flowing through the first side. For example, the system can include a heat exchanger 190 (e.g., a counter flow heat exchanger) defining a first side (e.g., cold-side) and a second side (e.g., hot-side). The exhaust outlet 134 can be configured to convey the exhaust stream—exiting the high-pressure vessel 110—across the first side of the heat exchanger 190. The heat exchanger 190 can be configured to transfer heat—extracted from gases (e.g., exiting the secondary turbine 140) flowing across the second side of the heat exchanger 190—into the exhaust stream flowing across the first side of the heat exchanger 190 to increase a temperature of the exhaust stream.

Additionally, in this implementation, the system 100 can further include a chamber 192 coupled to the heat exchanger 190 and configured to transfer heat into the exhaust stream. In particular, Block S144 of the method S100 recites transferring the exhaust stream from the first side of the heat exchanger 190 into a chamber 192 configured to transfer heat into the exhaust stream and increase a pressure of the exhaust stream. For example, the system 100 can include a chamber 192 (e.g., an isochoric heating chamber) configured to: enable transfer of heat from a heat source, coupled (e.g., thermally and/or fluidly coupled) to the chamber 192, into the exhaust stream to increase a temperature of the exhaust stream; and pressurize the exhaust stream (e.g., increase a pressure of the exhaust stream). In this example, the chamber 192 can include: a heat inlet configured to transfer heat (e.g., fluid or combustion) from an exterior heat source (e.g., concentrated solar, geothermal, nuclear, burning) into the chamber 192 for transferring heat into the exhaust stream within the chamber 192; and a heat outlet configured to release excess heat from the chamber 192. The resulting exhaust stream exiting the chamber 192 can therefore exhibit increased pressure and temperature via transfer of heat from the heat source into the exhaust stream.

In this implementation, the exhaust stream can then be transferred from the chamber 192 to the secondary turbine 140 for depressurization. In particular, Block S146 of the method S100 recites conveying the exhaust stream from the chamber 192 through a secondary turbine 140 mechanically coupled to the compressor 120 and configured to: reduce the pressure of the exhaust stream by extracting energy from the exhaust stream; and supply power to the compressor 120 via transfer of energy extracted from the exhaust stream. For example, the system 100 can include: the motor 150 mechanically coupled to the driveshaft 152; the compressor 120 mechanically coupled to the driveshaft 152 on a first side of the motor 150; and the secondary turbine 140 mechanically coupled to the driveshaft 152 on a second side of the motor 150 opposite the first side. The secondary turbine 140 can therefore: depressurize (e.g., reduce a pressure of) the exhaust stream by extracting energy from this exhaust stream (e.g., a high-pressure, high-temperature exhaust stream); and transfer this extracted energy into a torque on the driveshaft 152 to drive the compressor 120, thereby reducing an amount of energy required by the motor 150 to power the compressor 120.

Block S148 of the method S100 recites conveying the exhaust stream from an outlet of the secondary turbine 140 through a second side of the heat exchanger 190 configured to extract heat from the exhaust stream flowing through the second side. In particular, the system 100 can include a second exhaust outlet 134 configured to convey the exhaust stream—exiting the secondary turbine 140 at a reduced pressure—from the outlet of the secondary turbine 140 across the second side (e.g., hot-side) of the heat exchanger 190. The heat exchanger 190 can be configured to: extract heat from the exhaust stream (e.g., the low-pressure exhaust stream exiting the secondary turbine 140) flowing across the second side (e.g., hot-side) of the heat exchanger 190 to reduce a temperature of the exhaust stream; and transfer this extracted heat into the exhaust stream (e.g., the high-pressure exhaust stream exiting the high-pressure vessel no) flowing across the first side (e.g., cold-side) of the heat exchanger 190. The cooled, depressurized exhaust stream (e.g., approaching ambient temperature and pressure) can then be released from an outlet of the second side of the heat exchanger 190 into an external environment (e.g., atmospheric air).

Additionally and/or alternatively, in another variation, the system 100 can include a secondary compressor mechanically coupled to the secondary turbine 140 via the driveshaft 152. In this variation, the secondary turbine 140 can be configured to expand the high-pressure, high-temperature exhaust stream (i.e., secondary gases) exiting the high-pressure vessel 110 and/or series of heating elements, as described above. The secondary turbine 140 can then transfer energy extracted from the exhaust stream into a torque on the driveshaft 152 to drive the secondary compressor mechanically coupled to the driveshaft 152. The secondary compressor can be configured to: intake ambient air (e.g., atmospheric air, indoor air) and compress this ambient air to increase a pressure of the air above ambient pressure; and feed this pressurized air to an inlet of the venturi 112—fluidly coupled to the secondary compressor—thereby enabling an increased rate of absorption of carbon dioxide from air into the working fluid after mixing in the venturi 112 and decreasing an energy intake of the compressor 120.

Additionally and/or alternatively, in this variation, excess energy extracted from the exhaust stream by the secondary turbine 140 can be directed to the power grid. Therefore, the system 100 can be leveraged to both sequester carbon dioxide from ambient air and generate clean renewable energy.

8. Variation: Liquid Metal Catalyst

In one variation, Blocks S172 and S174 of the method S100 recite: transferring carbon dioxide collected from the low-pressure vessel 130 into a reaction vessel 170 including a liquid metal catalyst configured to promote conversion of carbon dioxide into carbon and oxygen; and releasing oxygen from the reaction vessel 170 via an exhaust valve in Block S174; and releasing carbon from the reaction vessel 170 for collection.

In this variation, the system 100 can include a reaction vessel 170: configured to receive the volume of carbon dioxide released from the collection outlet 160; and including a liquid metal catalyst (e.g., a liquid metal alloy including gallium, tin, and/or cerium) configured to promote conversion of carbon dioxide into carbon and oxygen. For example, the system 100 can include a reaction vessel 170 (e.g., a vat) filled with a volume of the liquid metal catalyst configured to promote catalytic conversion of carbon dioxide into carbon black and oxygen gas. The reaction vessel 170 can be configured to hold a temperature of the liquid metal catalyst within a target reaction temperature range (e.g., between 25 degrees Celsius and 35 degrees Celsius) configured to maximize a catalytic rate of conversion of carbon dioxide to carbon and oxygen.

In this variation, carbon dioxide can be transferred through (e.g., bubbled through) the reaction vessel containing the liquid metal catalyst. The liquid metal catalyst can be configured to include a set of metals exhibiting a melting point within a particular temperature range, such as corresponding to a temperature of the carbon dioxide (e.g., carbon dioxide gas) exiting the low-pressure vessel, thereby eliminating a need for heating and/or cooling of the carbon dioxide before contacting the liquid metal catalyst. A current of electricity can be supplied to the liquid metal catalyst to enable transfer of charged electrons to the oxygen and therefore disassociation of carbon dioxide into oxygen and carbon.

For example, a carbon dioxide stream exiting the low-pressure vessel at approximately thirty degrees Celsius (e.g., within ten percent, twenty percent) can be bubbled through and/or around the liquid metal catalyst—such that the carbon dioxide contacts the liquid metal catalyst—within the reaction vessel. Concurrently, an electric current can be supplied to the liquid metal catalyst. Therefore, as the carbon dioxide gas contacts the charged liquid metal catalyst, charged electrons are transferred to oxygen present in the carbon dioxide stream, thereby promoting dissociation of oxygen from carbon in the carbon dioxide stream. As this oxygen separates from carbon in the carbon dioxide stream, carbon black (e.g., solid carbon black) can develop on a surface (or surfaces) of the liquid metal catalyst. This carbon black can then be removed from the surface of the liquid metal catalyst for collection. The oxygen (e.g., oxygen gas) can be released from the reaction vessel, such as into the atmosphere and/or for collection.

In one implementation, the liquid metal catalyst is a liquid metal alloy including a first concentration of indium; a second concentration of tin; and a third concentration of gallium. Additionally and/or alternatively, in another implementation, the liquid metal alloy can include a fourth concentration of cerium. In each of these implementations, the reaction vessel 170 can be configured to hold a temperature of the liquid metal catalyst within a threshold deviation (e.g., 2 degrees Celsius) of 30 degrees Celsius, based on a melting point of the liquid metal alloy (e.g., each metal in the liquid metal alloy).

However, the reaction vessel 170 can include any other liquid metal catalyst configured to promote conversion (e.g., disassociation) of carbon dioxide into carbon and oxygen.

In this variation, the system can further include an oxygen outlet 172 and a carbon accumulator 174. The oxygen outlet 172 is configured to release oxygen (e.g., oxygen gas) from the reaction vessel 170 and the carbon accumulator 174 is configured to collect carbon released from the reaction vessel 170. In one example, as shown in FIG. 3, the oxygen outlet 172 can be arranged within an upper region of the reaction vessel 170, such that oxygen gas collecting in the upper region of the reaction vessel 170 is released via the oxygen outlet 172 while solid carbon collects in a lower region of the reaction vessel 170. Further, in this example, the oxygen outlet 172 can include a flame arrestor configured to regulate flow of oxygen out of the oxygen outlet 172 and into the external environment (e.g., atmosphere). Additionally and/or alternatively, in this example, the system 100 can include an oxygen accumulator coupled to the oxygen outlet 172 and configured to collect oxygen gas for storage.

By thus executing Blocks of the method S100 to convert carbon dioxide to oxygen (e.g., oxygen gas) and carbon (e.g., carbon black), the system 100 can: remove carbon dioxide from ambient air drawn through the system 100; and store this sequestered carbon dioxide in the form of useable products—such as carbon black and oxygen gas—thereby eliminating a need to store the volumes of carbon dioxide captured by the system 100 and sourcing these products generated from the collected volumes of carbon dioxide via an energy-efficient (e.g., reduced energy consumption via energy recapture within the system 100), carbon negative process.

9. Variation: Vertical Narrow Compressor

Figure 9:
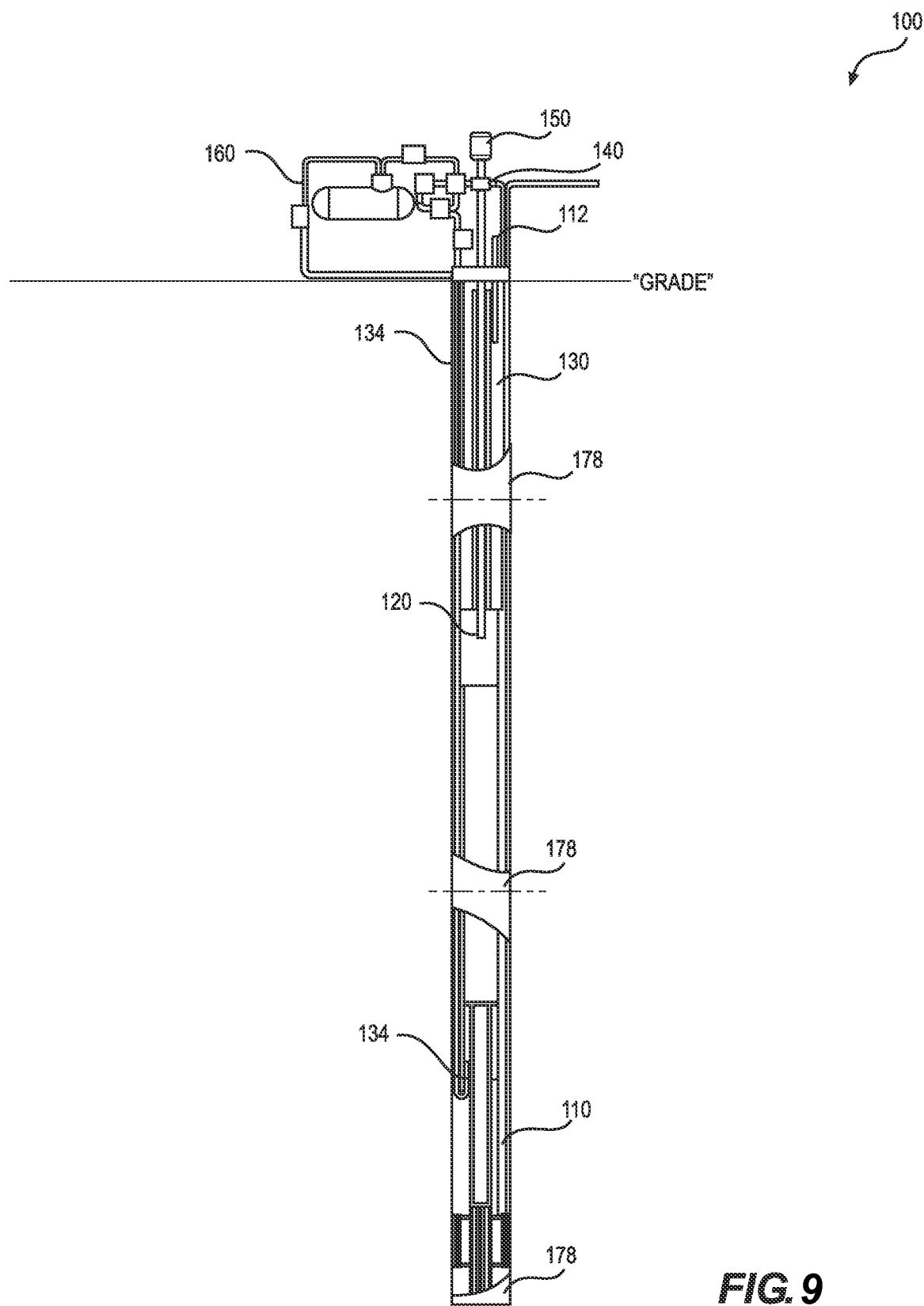
FIG. 9 is a schematic representation of the system.

In one variation, as shown in FIG. 9, the system 100 can be configured to transfer heat from the atmosphere into the ground. In this variation, the system 100 can include a housing tube 178 configured to pump the working fluid vertically below a surface of the ground to enable geothermal heat exchange between the working fluid and the ground which exhibits a higher heat capacity than the working fluid and air. Further, the housing tube 178 can extend to a particular depth (e.g., less than 400 feet) below the surface such that the working fluid and entrained air—forming the first mixture—can be compressed via gravity while flowing vertically downward through the housing tube 178.

The housing tube 178 can be configured to maximize heat transfer between the working fluid and the ground. For example, the housing tube 178 can be configured to: extend below the surface of the ground to a particular depth in order to maximize a surface area over which heat can transfer between the working fluid and the ground; and include walls of a maximum thickness in order to minimize a distance that heat must travel from the working fluid, through the housing tube 178, and to the ground.

For example, the working fluid can be mixed with air—including carbon dioxide and the set of secondary gases—to form the first mixture. The first mixture can then flow—via gravity—down the housing tube 178 from a surface of the ground toward a particular depth (e.g., 300 feet) below the surface. As the first mixture flows down the housing tube 178, the pressure of the first mixture increases at greater depths below the surface, thus enabling absorption of carbon dioxide into the working fluid. Further, the first mixture can flow past a heat exchanger 124 configured to extract heat from the working fluid, thereby cooling the working fluid and enabling (near) isothermal compression of the first mixture. Heat extracted by this heat exchanger 124 can be released into the ground for geothermal heat exchange, thereby enabling heat transfer from the atmosphere into the ground.

At a bottom (i.e., the high-pressure vessel 110) of the housing tube 178, the high-pressure high-energy secondary gases can separate from the working fluid and dissolved carbon dioxide. These secondary gases can be released from this high-pressure vessel 110 via the exhaust outlet 134 travelling upward through the housing tube 178. The remaining second mixture—including the working fluid and dissolved carbon dioxide—can be pumped upward via a fluid return tube within the housing tube 178. As the second mixture is pumped upward through the fluid return tube, the pressure of the high-pressure high-energy second mixture decreases at depths closer to the surface of the ground, thus enabling desorption of carbon dioxide from the working fluid. Therefore, at or near the surface of the ground, carbon dioxide can be separated from the working fluid and collected via the collection outlet 160.

10. Deployment

The system 100 can be deployed to various locations and/or types of locations for sequestering carbon dioxide from the atmosphere. In particular, the system 100 includes few moving parts—such as the compressor 120, the turbine 140, and the motor 150, each mechanically coupled to a singular driveshaft 152—thereby enabling rapid assembly and deployment of the system 100 to various locations. For example, the system 100 can be assembled in a central facility (e.g., a central factory) and shipped (e.g., in a shipping container) to geographic locations remote from the central facility, such as on a flatbed, a trailer, a ship, and/or an aircraft.

Further, the system 100 can be scaled based on the location and/or type of location at which the system 100 will be deployed or installed. For example, a first instance of the system 100 configured for deployment to a large geographic region—such as a geological sequestration site, a power station, and/or a farm—can exhibit a first size (e.g., approximating a size of a shipping container) and be configured to intake large volumes of ambient air (e.g., atmospheric air) to sequester large volumes of carbon dioxide (e.g., greater than 100,000 metric tons per year). In this example, a second instance of the system 100 configured for deployment to a relatively small region—such as a home or office building—can exhibit a second size smaller than first size, such that the second instance of the system 100 can be installed within the small region (e.g., mounted to a building, installed within a home or yard). This second instance of the system 100 can be configured to intake smaller volumes of ambient air to sequester smaller volumes of carbon dioxide in the smaller region.

Once deployed to a particular location, the system 100 can integrate with existing infrastructure to rapidly install and power the system 100. For example, the system 100 can be configured to access a local power supply (e.g., by connecting the system 100 into the local power supply)—such as corresponding to a size of the system 100—and immediately begin ingesting ambient air for capturing carbon dioxide.

For example, a first instance of the system 100 can be configured for deployment to a first location. This first instance of the system 100 can be configured to connect to a first power supply of a first magnitude (e.g., a 400-Amp power supply) at the first location to capture carbon dioxide from ambient air at the first location at a first carbon dioxide collection rate (e.g., exceeding 100,000 metric-tons-per-year). Additionally, a second instance of the system 100 can be configured for deployment to a second location. This second instance of the system 100 can be configured to connect to a power supply of a second magnitude (e.g., a 30-Amp power supply), less than the first magnitude, at the second location to capture carbon dioxide from ambient air at the second location at a second carbon dioxide collection rate (e.g., less than 100,000 metric-tons-per-year) less than the first carbon dioxide collection rate. Therefore, in this example, instances of the system 100—exhibiting various sizes based on location of deployment and/or target carbon dioxide collection rate—can be configured to access a local power supply (e.g., an existing, local power supply) matched (e.g., proportional) to a size and/or target carbon dioxide collection rate of each instance of the system 100.

Additionally and/or alternatively, in one implementation, the system 100 can be deployed as a modular unit—distributed about a geographic region or location—such that each individual unit, in the modular unit, is configured to capture carbon dioxide from the geographic region. In this implementation, the system 100 can be configured to: operate each unit of the modular unit continuously to continuously capture carbon dioxide from this location; operate each unit of the modular unit at a particular frequency; and/or operate different units of the modular unit over particular periods of time and/or at particular frequencies in order to balance a load of the modular unit.

In one example, the system 100 can be configured for deployment to a particular geographic location including a power station (e.g., a wind turbine farm, a solar farm, a power plant). In this example, the system 100 can include a set of modular units of the system 100 distributed about the particular geographic location, each modular unit, in the set of modular units, configured to intake ambient air from the particular geographic location and capture carbon dioxide from this ambient air. The system 100 can configured to selectively operate modular units, in the set of modular units, in order to achieve a target carbon dioxide collection rate (e.g., exceeding 100,000 metric-tons-per-year) at the particular geographic location. Further, the system 100 can be configured to selectively operate modular units, in the set of modular units, in order to enable load flexibility at this particular geographic location. The system 100 can therefore: selectively activate (e.g., by selectively accessing power generated by the power station) modular units in the set of modular units; and selectively disable modular units in the set of modular units in order to balance power consumption by the set of modular units and power supply to an electrical grid connected to the power station.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A system comprising:
    a venturi configured to mix ambient air comprising carbon dioxide and secondary gases with a working fluid to generate a first mixture comprising a volume of ambient air dispersed throughout the working fluid:
    a compressor mechanically coupled to a driveshaft and configured to pressurize the first mixture from a first pressure in a first pressure range at a compressor inlet to a second pressure within a second pressure range greater than the first pressure range at a compressor outlet to promote absorption of carbon dioxide into the working fluid;
a motor mechanically coupled to the driveshaft and configured to drive the compressor;
a high-pressure vessel configured to:
   receive the first mixture from the compressor outlet; and
   promote separation of the gaseous phase and the liquid phase to generate an exhaust stream comprising secondary gases and a second mixture comprising carbon dioxide dissolved in the working fluid;
an exhaust outlet configured to release the exhaust stream from the high-pressure vessel;
a turbine mechanically coupled to the driveshaft and configured to reduce a pressure of the second mixture exiting the high-pressure vessel from a third pressure within a third pressure range at a turbine inlet to a fourth pressure within a fourth pressure range, pressures within the fourth pressure range less than pressures within the third pressure range, at a turbine outlet to promote desorption of carbon dioxide from the working fluid;
a low-pressure vessel configured to:
   receive the second mixture from the turbine outlet; and
   promote separation of carbon dioxide from the working fluid; and
a collection outlet configured to release a volume of carbon dioxide from the low-pressure vessel for collection.

2. The system of claim 1, wherein the turbine is configured to:
reduce the pressure of the second mixture by extracting energy from the second mixture; and
transfer energy extracted from the second mixture into a torque on the driveshaft to drive the compressor.

3. The system of claim 1, further comprising a heat exchanger coupled to the compressor and configured to regulate a temperature of the first mixture within a target temperature rate from the compressor inlet to the compressor outlet by extracting heat, generated by compressing air present in the first mixture within the compressor, from the working fluid.

4. The system of claim 1:
wherein the high-pressure vessel is nested within the low-pressure vessel and configured to maintain the pressure of the first mixture within the second pressure range; and
wherein the low-pressure vessel is configured to maintain the pressure of the second mixture within the first pressure range.

5. The system of claim 4:
wherein the driveshaft extends through the low-pressure vessel along a central axis of the low-pressure vessel;
wherein the motor is mechanically coupled to the driveshaft external the low-pressure vessel;
wherein the compressor is mechanically coupled to the driveshaft within the low-pressure vessel; and
wherein the turbine is mechanically coupled to the driveshaft within the low-pressure vessel.

6. The system of claim 1, further comprising:
a heat exchanger coupled to the low-pressure vessel and configured to extract heat from the working fluid exiting the low-pressure vessel; and
a fluid return configured to convey the working fluid from the heat exchanger to the venturi for mixing with ambient air.

7. The system of claim 1, further comprising:
a heat exchanger coupled to the exhaust outlet and configured to transfer heat into the exhaust stream flowing through the exhaust outlet;
a chamber:
   configured to receive the exhaust stream from an outlet of the heat exchanger;
   configured to increase a pressure of the exhaust stream; and
   coupled to a heat source configured to transfer heat into the exhaust stream;
a secondary turbine mechanically coupled to the driveshaft and configured to:
   reduce the pressure of the exhaust stream by extracting energy from the exhaust stream; and
   transfer energy extracted from the exhaust stream into a torque on the driveshaft to drive the compressor; and
a second exhaust outlet configured to convey the exhaust stream from an outlet of the secondary turbine through the heat exchanger for extraction of heat from the exhaust stream flowing through the second exhaust outlet.

8. The system of claim 1, further comprising:
a reaction vessel:
   configured to receive the volume of carbon dioxide from the collection outlet; and
   comprising a liquid metal catalyst configured to promote conversion of carbon dioxide into carbon and oxygen;
an oxygen outlet configured to release oxygen from the reaction vessel; and
a carbon accumulator configured to collect carbon released from the reaction vessel.

\* \* \* \* \*